Jan. 8, 1929.  1,697,904
W. P. COFFMAN ET AL
CLUTCH
Filed Dec. 15, 1924
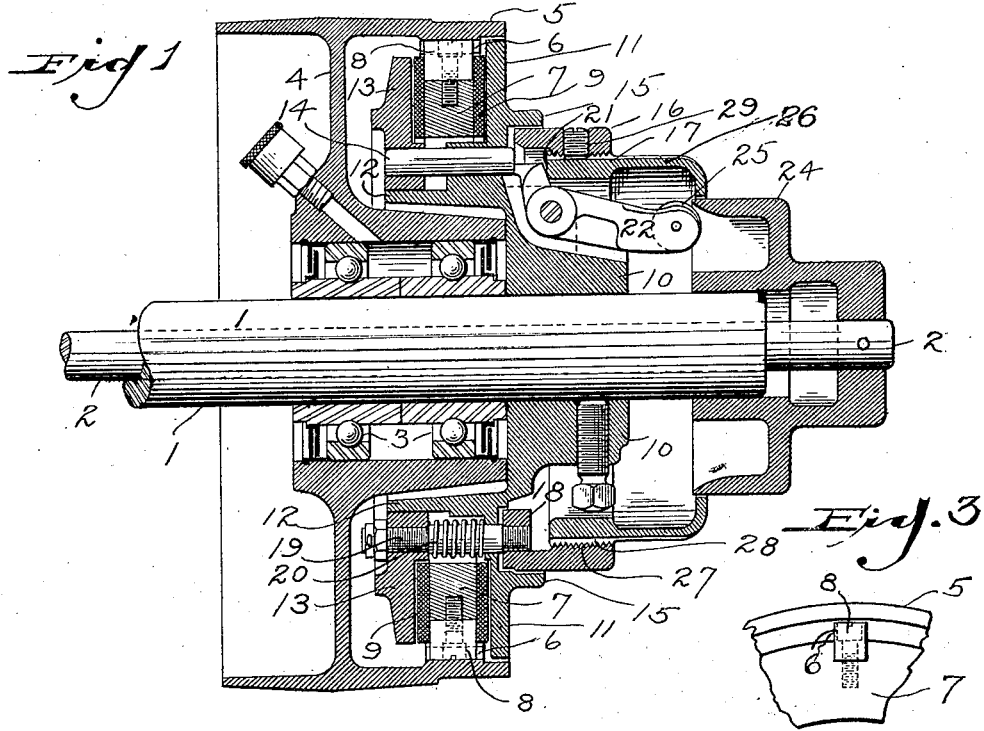
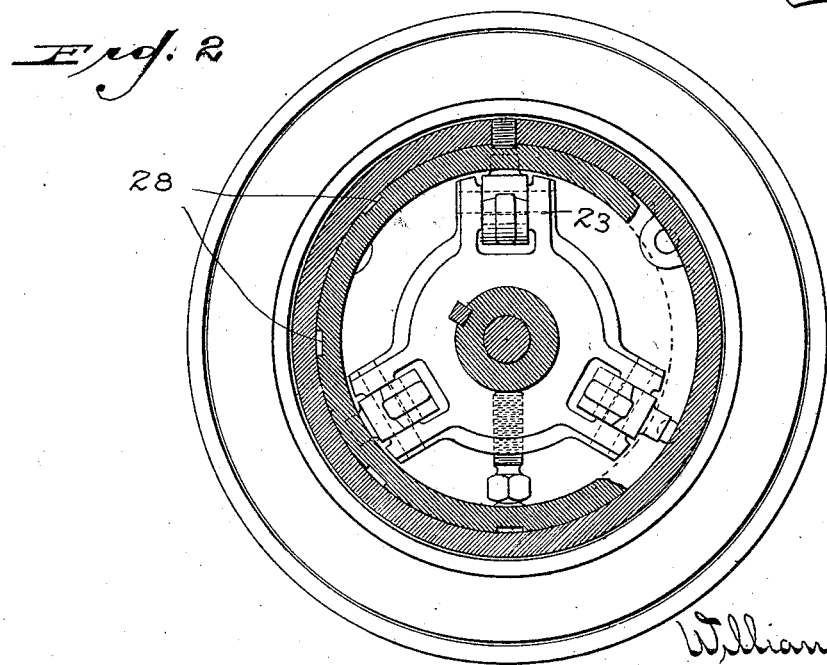

Patented Jan. 8, 1929.

1,697,904

UNITED STATES PATENT OFFICE.

WILLIAM P. COFFMAN, OF DUNKIRK, AND CARL M. ANGLEMYER, OF DAYTON, OHIO, ASSIGNORS TO THE EDGEMONT MACHINE COMPANY, OF DAYTON, OHIO, A CORPORATION OF OHIO.

CLUTCH.

Application filed December 15, 1924. Serial No. 755,972.

This invention relates to friction clutches and particularly to quick acting clutches of the disc or ring type.

In the present invention there is contemplated a construction embodying driving and driven members, one of which is fixed upon a shaft while the other is loosely journalled upon the shaft and carries a friction ring to be intermittently clamped to the fixed member. The structural features involve in the fixed member, a head portion having a peripheral flange forming one of a pair of clamping members for the engagement of the friction ring, such clamping flange having extending at one side thereof, an annular concentric flange upon which is slidingly mounted an axially movable clamp ring, coacting with the peripheral flange to clamp the friction ring interposed therebetween, while at the opposite side of the peripheral flange projects a second annular concentric flange forming a bearing upon which axially slides an adjusting ring formed in two relatively adjustable sections, one of which is coupled to the clamp ring, while the other is directly engaged by the series of oscillatory actuating levers, the relative adjustment of the sections of such ring serving to compensate for wear or to vary the clamping pressure of the adjustable clamping ring. The loose member has been illustrated as a flanged pulley within the interior of the flange of which the friction ring is mounted for independent axial adjustment but for rotation in unison with the pulley. It will be understood that in lieu of the pulley, other mechanical elements or structures to be connected with and disconnected from the shaft may be substituted.

The object of the invention is to simplify the structure as well as the means and mode of operation of quick acting frictional clutches, whereby they will not only be cheapened in construction, but will be more efficient in operation, uniform and positive in action, capable of being quickly and easily engaged and disengaged, of increased durability and unlikely to get out of repair.

A further object of the invention is to provide improved adjusting means for engaging and disengaging the driving and driven members and to further provide adjustable means of simple and economical form for varying the engaging pressure and for compensating for wear.

With the above primary and other incidental objects in view as will more fully appear in the specification, the invention consists of the features of construction, of the parts and combinations thereof, and the mode of operation or their equivalents as hereinafter described and set forth in the claims.

Referring to the accompanying drawings, wherein is shown the preferred, but obviously, not necessarily the only form of embodiment of the invention, Fig. 1 is a longitudinal sectional view of the assembled clutch mechanism embodying the present invention. Fig. 2 is a side elevation, partly in section. Fig. 3 is a detail view of the key connection between the fricton ring and pulley.

Like parts are indicated by similar characters of reference throughout the several views.

In the drawings, 1 is the shaft upon which the clutch mechanism is mounted. In this instance, the shaft is shown as hollow and having extending therethrough the reciprocatory rod 2 connected to the shift collar by which the clutch is set and released. It will be understood that this mode of operation is not an essential detail of the clutch construction. Mounted upon suitable ball bearings 3, upon the shaft 1, is a normally loose pulley 4. Within the flange 5 of the pulley 4 there are provided at spaced intervals key ways or grooved recesses 6, in which is slidingly mounted a friction ring 7, provided with splines or keys 8. This friction ring 7 is provided on opposite sides with strata or facings of friction material 9. The friction ring 7 is thus mounted for rotation in unison with the pulley 4, but capable of to and fro sliding movement in an axial direction in relation thereto.

Fixedly secured upon the shaft 1 is a second clutch element comprising a hub portion 10, provided with a peripheral flange disposed in a plane perpendicular to the axis of rotation. This peripheral flange 11, forms one of a pair of clamping members for gripping the friction ring 7. Projecting inwardly toward the pulley 4 from said flange 11, and overhanging the hub of the pulley is an annular flange 12, concentric with the axis of rotation. This flange 12, affords a bearing for an axially adjustable clamp ring 13, complementary to the flange 11, and which slides to and fro upon the annular flange 12 to grip the friction ring 7 intermediate the clamp ring 13 and peripheral flange 11. In addition to its bearing upon the annular flange 12, the clamp ring 13 is guided by a plurality of studs 14, mounted in the flange 11 and projecting through corresponding holes in the clamp ring 13.

At the outer side of the peripheral flange 11, there is provided a second annular flange 15, concentric in relation with the axis of rotation and enclosing an axially adjustable actuating ring. This actuating ring is formed in two sections 16 and 17, screw threaded one into the other. The section 16 is provided at spaced intervals with lugs or ears 18, in which are secured studs 19, by which the clamp ring 13 is coupled to the actuating ring. Helical springs 20 surrounding the studs 19 are interposed between the flange 11 and the clamp ring 13 yieldingly resisting the approach of the clamp ring and serving to effect a quick disengagement of the clamp ring from the friction ring upon the relaxation of pressure upon such spring. The section 17 of the actuating ring screw threaded within the section 16 affords an abutment shoulder 21, for the engagement of a series of oscillatory actuating levers 22 pivoted in suitable ears or lugs 23 upon the hub 10 of the fixed element. These levers 22 are oscillated by the engagement of a cam shaped shift collar 24, with rollers 25 carried by the oscillatory levers 22. As the shift collar 24 is moved axially, the levers 22 are oscillated causing them to bear against the shoulder 21 afforded by the section 17 of the actuating collar, thereby shifting such collar axially within its surrounding flange 15 to draw the clamp ring 13 into gripping engagement with the interposed friction ring 7. This gripping movement is effected by the coupling stud 19, and against the tension of the retracting spring 20.

The section 17 of the actuating ring is extended at 26 to form a housing or enclosure for the actuating levers. The construction is such that it presents a substantially smooth exterior with no projecting portions likely to catch the clothing or endanger the life of workmen. By revolubly adjusting the actuating ring sections 16 and 17 relative to each other, the abutment shoulder 21 is advanced or retracted thereby enabling the compensation for wear and enabling the adjustment of the clamp ring 13 independent of the actuating levers 22 to vary its gripping pressure. This adjustment is effected by the screw threaded engagement 27 of these ring sections. The screw threaded surface of one of these ring sections is provided with spaced grooves 28, arranged transversely of the screw threads 27. A set screw 29 is engageable in any one of these grooved depressions by the relative rotation of the ring sections 16 and 17 to secure said ring sections in their adjusted relation by which the engaging pressure of the clamp ring 13 is regulated.

Obviously, other mechanical elements, such as a gear wheel, winding drum, sprocket wheel or other device may be substituted for the flanged pulley 4. It is equally obvious that either the fixed or loose member may be employed as a driving member or the driven member as conditions may require.

From the above description it will be apparent that there is thus provided a device of the character described possessing the particular features of the advantage before enumerated as desirable, but which obviously is susceptible of modification in its form, proportions, detail construction and arrangement of parts without departing from the principle involved or sacrificing any of its advantages.

While in order to comply with the statute the invention has been described in language more or less specific as to structural features, it is to be understood that the invention is not limited to the specific details shown, but that the means and construction herein disclosed comprises the preferred form of several modes of putting the invention into effect and the invention is, therefore, claimed in any of its forms or modifications within the legitimate and valid scope of the appended claims.

Having thus described our invention, we claim:

1. In a friction clutch, a shaft, driving and driven members, one of which is loosely mounted for rotation relative to the shaft and the other fixedly mounted for rotation in unison with the shaft, said fixed member including a hub portion, a peripheral flange carried thereby in a plane perpendicular to the axis of rotation, and an annular flange also carried by said hub portion and extending concentrically in relation to the axis of rotation, a clamp collar exteriorly surrounding the annular concentric flange and slidable thereon toward and from the peripheral flange, a friction ring interposed between the clamp collar and the peripheral flange and operatively engaged with the loosely mounted member for rotation in unison therewith, but capable of axial movement independent thereof, an axially movable actuating ring operatively connected with the clamp collar to move the latter toward the peripheral flange to clamp the friction ring therebetween, an abutment shoulder having screw threaded engagement with the actuating ring, a plurality of operating levers pivoted upon said fixedly mounted member and upon operation engaging the abutment shoulder to effect clamping movement of the clamp ring, and means for oscillating the levers.

2. In a friction clutch, a shaft, driving and driven members, one of which is loosely mounted and the other fixedly mounted upon the shaft, said fixed member including a clamp face disposed in a plane substantially perpendicular to the axis of rotation, and an annular flange concentric with the axis of rotation, an axially movable clamp ring having sliding engagement with the annular flange toward and from the clamp face, a friction ring interposed between the clamp ring and face, and having operative engagement with the loosely mounted member, and means for adjusting the clamp ring including an axially movable actuating ring, having operative connection with the clamp ring, and a plurality of operating levers engaging the actuating ring to move the clamp ring into operative engagement with the friction ring, said actuating ring being formed in two telescopically arranged sections one of which is coupled with the clamp ring and the other of which affords an adjustable abutment for the operating levers, and means for maintaining the sections in different positions of relative adjustment.

3. In a friction clutch a single shaft, driving and driven elements, one of which is fixed to the shaft, the other of which is journaled thereon for free revoluble movement, a friction ring carried by one of said elements, a clamp collar carried by the other element and means for relatively adjusting the clamp collar and friction ring into and out of operative engagement including a plurality of operating levers, a pair of concentric rings surrounding the operating levers, said rings being axially adjustable relative to each other and also axially adjustable in unison, relative to said driving and driven elements, and tie means extending interiorly of the friction ring connecting the clamp collar and one of the axially adjustable concentric rings, the other of said rings being engaged by said levers.

In testimony whereof, we have hereunto set our hands this 12th day of December, A. D. 1924.

WILLIAM P. COFFMAN.
CARL M. ANGLEMYER.